(12) United States Patent
Tamachi et al.

(10) Patent No.: US 8,553,392 B2
(45) Date of Patent: Oct. 8, 2013

(54) ELECTRONIC COMPONENT, ELECTRONIC DEVICE, AND MANUFACTURING METHOD FOR THE ELECTRONIC COMPONENT

(75) Inventors: Tsuneaki Tamachi, Chiba (JP); Ryo Sato, Chiba (JP); Isamu Shinoda, Chiba (JP); Shunji Watanabe, Chiba (JP)

(73) Assignee: Seiko Instruments Inc., Chiba-Shi, Chiba (JP)

( * ) Notice: Subject to any disclaimer, the term of this patent is extended or adjusted under 35 U.S.C. 154(b) by 221 days.

(21) Appl. No.: 13/184,032

(22) Filed: Jul. 15, 2011

(65) Prior Publication Data

US 2012/0019983 A1 Jan. 26, 2012

(30) Foreign Application Priority Data

Jul. 26, 2010 (JP) ................................ 2010-167358
May 25, 2011 (JP) ................................ 2011-116744

(51) Int. Cl.
*H01G 9/00* (2006.01)
*H01G 2/10* (2006.01)

(52) U.S. Cl.
USPC .......................................... 361/502; 361/517

(58) Field of Classification Search
None
See application file for complete search history.

(56) References Cited

U.S. PATENT DOCUMENTS 8,264,818 B2 * 9/2012 Tamachi et al. ............... 361/502
2011/0317331 A1 * 12/2011 Lee et al. ...................... 361/502

FOREIGN PATENT DOCUMENTS

JP 2001-216952 A 8/2001

* cited by examiner

*Primary Examiner* — Jayprakash N Gandhi
*Assistant Examiner* — Dion Ferguson
(74) *Attorney, Agent, or Firm* — Brinks Hofer Gilson & Lione

(57) ABSTRACT

Provided is an electric double-layer capacitor and the like, which may be easily manufactured. In a recessed container (2) constituting a package of an electric double-layer capacitor (1), a step portion (4) is formed. With this, the recessed container (2) has two parallel bottom surfaces which are not provided in the same plane, that is, a first bottom surface constituting a bottom portion of a recessed portion (13) and a second bottom surface constituting an upper surface of the step portion (4). The first bottom surface and the second bottom surface respectively have metallic layers (11, 9) formed thereon, which pass through the recessed container (2) toward an outside to respectively connect to terminals (12, 10). Electrodes (6, 5) are respectively connected to the upper surfaces of the metallic layers (11, 9).

9 Claims, 8 Drawing Sheets

ELECTRONIC COMPONENT, ELECTRONIC DEVICE, AND MANUFACTURING METHOD FOR THE ELECTRONIC COMPONENT

RELATED APPLICATIONS

This application claims priority under 35 U.S.C. §119 to Japanese Patent Application Nos. 2010-167358 filed on Jul. 26, 2010 and 2011-116744 filed on May 25, 2011, the entire contents of which are hereby incorporated by reference.

BACKGROUND OF THE INVENTION

1. Field of the Invention

The present invention relates to an electronic component, an electronic device, and a manufacturing method for the electronic component, and more particularly, to an electrochemical cell such as an electric double-layer capacitor.

2. Description of the Related Art

The electric double-layer capacitor is a device which is charged through polarization of ions in an electrolyte and discharged, thereby supplying electric power.

The electric double-layer capacitor is characterized by this charging/discharging function, and hence is used, for example, in backup power sources for a clock function and a semiconductor memory for electronic devices, or used in standby power sources for electronic devices such as microcomputers and IC memories.

In particular, the electric double-layer capacitor capable of surface mounting can be downsized and reduced in thickness, and hence is suitable for thin mobile terminals.

In order to meet such demands for downsizing and reduction in thickness, the following Japanese Patent Application Laid-open No. 2001-216952 proposes, as described below, an electric double-layer capacitor in which a polarizable electrode and an electrolyte are accommodated in a container including a recessed portion and an opening portion is sealed with a sealing plate.

FIG. 10 is a cross-sectional view of a conventional electric double-layer capacitor 100.

On a bottom surface of a recessed container 102, which has a recessed portion 150 formed therein and is made of a ceramics, a metallic layer 111 is provided. A positive electrode 106 is bonded onto an upper surface of the metallic layer 111. The metallic layer 111 passes through the recessed container 102 to be electrically connected to a positive terminal 112 on a rear surface of the recessed container 102. In this manner, the positive electrode 106 is electrically connected to the positive terminal 112 via the metallic layer 111.

Further, a sealing plate 103 made of a metal is bonded onto an opening portion of the recessed portion 150 by a bonding material 108 made of a metal, to thereby seal the recessed portion 150. On a side surface of the recessed container 102, there is formed a metallic layer 109 connecting the bonding material 108 and a negative terminal 110 formed on the rear surface of the recessed container 102. A negative electrode 105 is bonded onto a lower surface of the sealing plate 103, and is electrically connected to the negative terminal 110 via the sealing plate 103, the bonding material 108, and the metallic layer 109.

Between the negative electrode 105 and the positive electrode 106, there is provided a separator 107 for preventing the negative electrode 105 and the positive electrode 106 from short-circuiting, and further, an electrolyte is sealingly filled in the recessed portion 150.

Further, the electric double-layer capacitor 100 stores charges when a voltage is applied to the negative terminal 110 and the positive terminal 112, and releases the stored charges to supply power for maintaining a clock function, to supply power to a memory, and to supply power for other purposes.

However, when strong electrical connection is desired between the sealing plate 103 and the negative electrode 105, it has been necessary to adhere the electrode onto the sealing plate 103 by a conductive adhesive in advance.

Therefore, after preparing two kinds of parts, that is, the recessed container 102 onto which the positive electrode 106 is adhered and the sealing plate 103 onto which the negative electrode 105 is adhered, the assembly is performed. Therefore, steps at the time of manufacture are complicated, which causes reduction in yield.

SUMMARY OF THE INVENTION

The present invention has an object to provide an electric double-layer capacitor and the like, which may be easily manufactured.

According to a first aspect of the present invention, there is provided an electronic component, comprising: a container including a hollow portion in which a first bottom surface and a second bottom surface, which is provided in a plane different from the first bottom surface, are formed; a first conductor, which is formed on the first bottom surface and passes through the container toward an outside; a second conductor, which is formed on the second bottom surface and passes through the container toward the outside; a first electrode disposed on the first conductor in the hollow portion; a second electrode, which is disposed on the second conductor in the hollow portion and is opposed to the first electrode at a predetermined interval; and an electrolyte, which is provided in contact with the first electrode and the second electrode.

According to a second aspect of the invention, in the first aspect of the invention, there is provided an electronic component, wherein: the hollow portion comprises a step portion including a step, which is formed at a bottom surface of the hollow portion; and the second bottom surface comprises an upper surface of the step portion.

According to a third aspect of the invention, in the first aspect of the invention, there is provided an electronic component, wherein the first conductor and the second conductor are connected to a first connection terminal and a second connection terminal, respectively, which are formed on a rear surface of the container.

According to a fourth aspect of the invention, in the first aspect of the invention, there is provided an electronic component further comprising a third conductor, which is disposed on a surface of the second electrode on a rear side of a surface opposed to the first electrode, and is connected to the second conductor.

According to a fifth aspect of the invention, in the first aspect of the invention, the first electrode and the second electrode are a negative electrode and a positive electrode, respectively, and the second electrode has a surface area larger than a surface area of the first electrode.

According to a sixth aspect of the invention, in the first aspect of the invention, further comprising a protruding portion, which is formed at a side of an end portion of the step portion and protrudes in an upper direction of the container.

According to a seventh aspect of the invention, in the first aspect of the invention, each of the first conductor and the second conductor passes through a side surface of the hollow portion.

According to an eighth aspect of the invention, in the first aspect of the invention, the first conductor passes through the first bottom surface, and the second conductor passes through the second bottom surface.

According to a ninth aspect of the invention, there is provided an electronic device, comprising: the electronic component according to the first aspect of the invention, the electronic component charging means for charging the electronic component; another electronic component exerting a predetermined function; and power supply means for supplying power to the another electronic component with use of electric charge that is stored by the charging means.

According to a tenth aspect of the invention, there is provided a manufacturing method for an electronic component, comprising: forming a container including a recessed portion in which a first bottom surface and a second bottom surface, which is provided in a plane different from the first bottom surface, are formed; forming a first conductor, which passes through the container from the first bottom surface toward an outside, and forming a second conductor, which passes through the container from the second bottom surface toward the outside, the forming of the first conductor and the forming of the second conductor being carried out one of together with and after the forming of the container; disposing a first electrode on the first conductor from an opening portion of the recessed portion; disposing a second electrode on the second conductor from the opening portion of the recessed portion, so as to be opposed to the first electrode at a predetermined interval; supplying an electrolyte to be provided in contact with the first electrode and the second electrode; and sealing the opening portion by a sealing member.

According to the present invention, two bottom surfaces are provided in the recessed portion to dispose the electrodes. In this manner, it is possible to easily manufacture the electric double-layer capacitor and the like.

Figure 1:
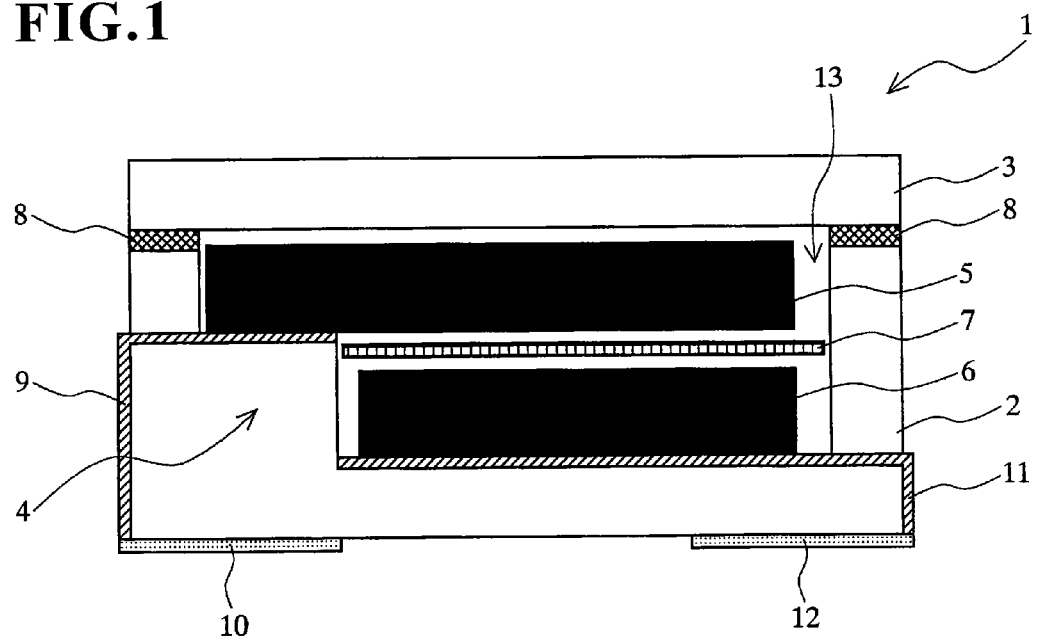
FIG. 1 is a side cross-sectional view of an electric double-layer capacitor according to an embodiment of the present invention.

DETAILED DESCRIPTION OF THE PREFERRED EMBODIMENTS (1) Summary of Embodiment

In a recessed container 2 constituting a package of an electric double-layer capacitor 1 (FIG. 1), a step portion 4 is formed. With this, the recessed container 2 has two parallel bottom surfaces which are not provided in the same plane, that is, a first bottom surface constituting a bottom portion of a recessed portion 13 and a second bottom surface constituting an upper surface of the step portion 4.

The first bottom surface and the second bottom surface respectively have metallic layers 11 and 9 formed thereon, which pass through the recessed container 2 toward an outside to respectively connect to terminals 12 and 10. Further, electrodes 6 and 5 are respectively connected to upper surfaces of the metallic layers 11 and 9.

Between the electrodes 6 and 5, a separator 7 is provided, and further, an electrolyte is filled in the recessed portion 13.

A sealing plate 3 is bonded to an opening portion of the recessed portion 13 by a bonding material 8, to thereby form a hollow portion (cavity) by the recessed portion 13 and the sealing plate 3.

As described above, the electrodes 6 and 5 are respectively disposed on the bottom surfaces of the recessed portion 13, and hence the electric double-layer capacitor 1 can be manufactured by work from the upper side.

Therefore, the manufacturing work is simplified, which enables improvement in productivity and yield.

(2) Details of Embodiment

Description is made of an electrochemical cell constituting an electronic component in this embodiment with reference to the drawings. Note that, in the following, although description is made of the electric double-layer capacitor as an embodiment, the electronic component may include electrochemical cells of other types, such as a non-aqueous electrolytic cell.

FIG. 1 is a side cross-sectional view of the electric double-layer capacitor 1 according to this embodiment. The electric double-layer capacitor 1 has a rectangular-parallelepiped shape, and is approximately 1 (mm) high, approximately 5 (mm) wide, and approximately 5 (mm) long.

The electric double-layer capacitor 1 includes the recessed container 2 including the recessed portion 13 in which the step portion 4 is formed, the sealing plate 3, the electrode 5, the electrode 6, the separator 7, the bonding material 8, the metallic layer 9, the terminal 10, the metallic layer 11, the terminal 12, and the electrolyte sealingly filled in the recessed portion 13.

The terminals 10 and 12 are terminals for surface mounting. Hereinafter, a side of the terminals 10 and 12 is assumed as a lower direction, and a side of the sealing plate 3 is assumed as an upper direction.

Note that, in FIG. 1, for easy understanding of the bonding relationship of the members, gaps are illustrated between the sealing plate 3 and the electrode 5, between the electrode 5 and the separator 7, and between the separator 7 and the electrode 6, but those members may be packed in the recessed portion 13 without being provided with the gaps.

The recessed container 2 includes the recessed portion 13 in which the step portion 4 is formed at a bottom surface thereof.

The recessed container 2 is made of, for example, a ceramics containing alumina, and is formed by integrating, by baking, a plurality of laminated ceramic sheets called green sheets, which have flexibility. In each of the green sheets, the opening portion corresponding to the shapes of the recessed portion 13 and the step portion 4 is formed (that is, the green sheet corresponding to the recessed portion 13 serves as a frame-shaped member), and by laminating the green sheets with the opening portions aligned, the step portion 4 and the recessed portion 13 are formed.

Note that, although not shown, at the end portion of the opening portion of the recessed container 2, a metalization layer to which the bonding material 8 is bonded is formed.

The metallic layer 9 is formed on the upper surface of the recessed portion 13. The metallic layer 9 passes through the recessed container 2 toward the outside, and extends on the side surface of the recessed container 2, to thereby be electrically connected to the terminal 10 formed on the rear surface of the recessed container 2.

The metallic layer 11 is formed on the bottom surface of the step portion 4. The metallic layer 11 passes through the recessed container 2 toward the outside, and extends on the side surface of the recessed container 2, to thereby be electrically connected to the terminal 12 formed on the rear surface of the recessed container 2.

The metallic layers 9 and 11 are formed by performing conductor printing onto the green sheets and then baking the recessed container 2. Portions of the metallic layers 9 and 11 which are formed on the outer side surfaces of the recessed container 2 are additionally formed after the lamination of the recessed container 2.

The conductor printing of the metallic layers 9 and 11 is performed by, for example, screen printing with the use of ink containing a high melting point metallic material such as tungsten (W), which has corrosion-resistant characteristics and can withstand baking of the recessed container 2. In particular, tungsten is suitable for the metallic layers 9 and 11 to be formed in the recessed portion 13 because tungsten has a high melting point, does not easily oxidize, has moderate adhesion intensity with a ceramic surface, and has a practicable electric resistance even after baking.

Further, on the surfaces of the metallic layers 9 and 11 at least in portions which are provided in contact to the electrolyte (including collector portions bonding to the electrodes 5 and 6), a protective film (conductive protective layer) may be formed of a metal having good corrosion-resistant characteristics, such as aluminum, titanium, and niobium, by thick film processing such as a vacuum vapor deposition method or and RF sputtering method. Further, it is also possible to employ a conductive resin.

When a film made of aluminum, titanium, niobium, and the like, or a conductive resin is provided on tungsten to be used as the metallic layers 9 and 11, it is possible to prevent tungsten from dissolving into the electrolyte. That is, it is possible to protect the metallic layers 9 and 11 from elution to prevent deterioration in quality. Note that, this conductive protective layer may be provided only on one of the metallic layers 9 and 11 which is connected to the positive electrode side.

Note that, the conductive protective layer may be formed by wet plating of Au or Cu. Further, the conductive protective layer may be formed by Cu alloy plating or Au alloy plating.

In the embodiment and modified examples, illustration of the conductive protective layer (protective film) with respect to the metallic layers 9 and 11 is omitted, but the conductive protective layer is preferred to be formed as described above.

The terminals 10 and 12 are formed by, after, together with the metallic layers 9 and 11, the conductor printing is performed onto the green sheets using ink containing tungsten and then baking is performed, plating gold, nickel, or the like on the surface of the baked green sheets. Examples of the plating include electroplating and electroless plating. Alternatively, a gas phase method such as vacuum vapor deposition may be used to form the terminals 10 and 12.

With this, high solder wettability of the terminals 10 and 12 is ensured, and thus the electric double-layer capacitor 1 may successfully be surface-mounted on a substrate.

Note that, in this embodiment, the terminals 10 and 12 are provided on the outer rear surface portion of the recessed container 2, but may be formed on the outer side surface portion, or may be continuously formed from the outer rear surface to the outer side surface.

The electrode 6 is formed by cutting an electrode active material formed in a sheet shape, which has activated carbon as the main component. As the electrode active material, for example, there may be used carbides of a coconut shell, which is a natural material, and carbides of a coal pitch, a petroleum pitch, and a phenolic resin, which are artificial materials, the carbides being respectively activated by moisture, a chemical agent, or by an electrical method.

In the recessed portion 13, the electrode 6 is bonded onto the upper surface of the metallic layer 11 by a conductive adhesive and the like, and a portion of the metallic layer 11 bonding to the electrode 6 functions as a collector. The electrode 6 is electrically connected to the terminal 12 via the metallic layer 11.

The electrode 5 is made of the same material as the electrode 6. On the upper surface of the step portion 4, one end portion of the electrode 5 is bonded onto the surface of the metallic layer 9 by a conductive adhesive and the like, and the other end portion thereof is projected inside the recessed portion 13. A portion of the metallic layer 9 bonding to the electrode 5 functions as a collector. The electrode 5 is electrically connected to the terminal 10 via the metallic layer 9.

The height of the step portion 4 is set to be larger than the thickness of the electrode 6, and the upper surface of the electrode 6 and the lower surface of the electrode 5 are opposed to each other at a predetermined interval therebetween.

As described above, two collectors (metallic layers 11 and 9) are respectively formed on the first bottom surface (bottom of the recessed portion 13) and the second bottom surface (upper surface of the step portion 4), which are parallel to each other but not in the same plane in the bottom portion of the recessed portion 13. The plate-shaped electrodes 6 and 5 are retained in a manner facing each other.

Therefore, the electrodes 5 and 6 both have the collectors formed on the same side (bottom side) of the recessed portion 13.

The separator 7 is provided between the electrode 5 and the electrode 6 so as to prevent short-circuiting caused by contact of the electrode 5 and the electrode 6.

Examples of the materials for the separator 7 include a nonwoven cloth formed of a material obtained through impartment of a hydrophilic property with respect to surfaces of, for example, heat resistant resins such as polyphenylene sulfide (PPS), polyether ether ketone (PEEK), denatured PEEK, and polytetrafluoroethylene (PTFE), and a glass fiber. Further, a cellulose-based separator may be used.

The separator 7 is preferred to have a function of preventing the electrodes 5 and 6 from short-circuiting and further have a function of retaining a larger amount of electrolyte, that is, a high liquid retention function of an electrolyte. As the separator 7 of this embodiment, PTFE is used, but a glass fiber is most desired from the viewpoint of the liquid retention function.

Further, the separator 7 may have a shape that an outer circumference portion other than a portion on the step portion 4 side (three end portions) is upwardly curved, or a recessed shape in which the outer circumference portion other than the portion on the step portion 4 side is provided with an outer circumference wall. The separator 7 in this case is disposed so that an inner side surface of the outer circumference portion other than the portion on the step portion 4 side is opposed to the side surface of the electrode 5. In this manner, the contact between the electrode 5 and the electrode 6 may be avoided more surely.

The electrolyte sealingly filled in the recessed portion 13 is a solution obtained through, for example, dissolution of a supporting electrolyte such as (CH3).(CH4)3N.BF4 into a non-aqueous solvent such as PC (propylene carbonate) or SL (sulfolane). As described above, although the supporting electrolyte is used in the liquid form in this embodiment, the gel or solid electrolyte may be used. Depending on sealing methods, when a liquid solvent is used as the electrolytic solution, it is desired that a boiling point be 200° C. or higher. In addition, it is desired that a vapor pressure do not rise by heat applied at the time of sealing. Although a solvent having a low boiling point of lower than 100° C. may be added into the electrolyte, it is desired that a vapor pressure at least at a melting point of each of the resins be 0.2 MPa-G or lower.

In a case where the electrolytic solution is injected, by performing depressurization, heating, and pressurization separately or in combination after the electrolytic solution is injected into the recessed portion 13, the electrode may be impregnated with the electrolyte deeply.

The bonding material 8 is a metal member provided around the entire circumference of the edge portion of the recessed portion 13 at the upper end thereof, and is heated while applying pressure to the sealing plate 3 to be melted, thereby bonding the sealing plate 3 and the recessed container 2.

Specifically, parallel seam welding may be used, in which a roller electrode is brought into contact with the edge portion of the sealing plate 3 under a moderate pressure and is caused to rotatably run while being applied with power. The bonding material 8 is heated due to the contact resistance, and therefore pressurization and heating are performed. Instead of parallel seam welding, heat welding using a laser may also be employed.

In the case where the parallel seam welding is performed, materials of the bonding material 8 and the sealing plate 3 are desired to be selected from materials which go well together. For example, when electrolytic nickel or electroless nickel is used as the bonding material 8, kovar applied with electrolytic nickel or electroless nickel is used as the sealing plate 3. With this, it is unnecessary to increase the welding power beyond necessity.

Further, as the bonding material 8, a brazing material of gold, silver, and the like, or a solder material may be used.

The sealing plate 3 is a metal plate member made of kovar or nickel, and is bonded onto the upper end portion of the recessed container 2 through intermediation of the bonding material 8. With this, the recessed portion 13 is sealed to form an airtight hollow portion.

Note that, a sheet of an insulating member may be sandwiched between the electrode 5 and the sealing plate 3 so as to prevent contact between the electrode 5 and the sealing plate 3.

Further, in this embodiment, the electrode 5 is not provided on the sealing plate 3, and hence in order to avoid contact with the electrolyte, the sealing plate 3 may be provided with a protective layer at least at a portion corresponding to the opening portion of the recessed portion 13, preferably at the entire surface (recessed portion 13 side). The protective layer in this case is required to have a function of preventing chemical corrosion by the electrolyte and an insulating function.

In this embodiment, as a protective layer (first layer) for preventing chemical corrosion, a carbon-based protective layer is formed on the sealing plate 3. The carbon-based protective layer can be formed by employing such a method as sputtering, chemical vapor deposition (CVD), and filtered cathodic vacuum arc (FCVA).

Further, in order to ensure insulating property, on the carbon-based protective layer, an epoxy-based protective layer, a fluorine-based protective layer, or a phenolic protective layer is provided as a second layer. The protective layer as the second layer is formed by spraying using a twin-fluid nozzle or a single liquid nozzle, transfer using an elastic material, or immersion, or by coating using a dispenser which uses compressed air (liquid dispenser manufactured by, for example, Musashi Engineering Co., Ltd.), a mohno-pump (for example, manufactured by HEISHIN Ltd.), a doctor blade, a bar coater, a brush, or the like.

Further, as the material of the epoxy-based protective layer, an epoxy resin may be used. As the material of the fluorine-based protective layer, a suspension in which a fine powder of polyvinylidene fluoride (PVDF) or PTFE dissolved in N-methylpyrrolidone (NMP) is dispersed in a surfactant agent may be used. As the material of the phenolic protective layer, a mixed solution of phenolic solution and formaldehyde may be used.

Further, the protective layer as the second layer is provided in contact with the electrolyte, and hence the protective layer is preferred to be made of a material having a water-repellent function.

Further, the protective layer of the sealing plate 3 may be constituted of a single layer by employing a material having a corrosion prevention function and an insulating function (preferably, water-repellent function as well), for example, a silicone resin (rubber) or a fluoro-rubber.

Further, in the electric double-layer capacitor 1, the sealing plate 3 is not used as the collector, and hence the sealing plate 3 does not need to be made of a metal. Therefore, the sealing plate 3 may be made of a single material or a composite material of other types of materials such as a ceramics and a resin.

In addition, the electric double-layer capacitor 1 is heated at the time of a reflow process, and hence the material employed for the sealing plate 3 is desired to have a coefficient of thermal expansion close to that of the recessed container 2.

By the way, in the conventional technology, the electrode 6 is set as the positive electrode, and the electrode 5 is set as the negative electrode. This results from the following reasons.

That is, in the conventional technology, the sealing plate 3 doubles as a collector, and hence when the electrode 5 is set as the positive electrode, in order to prevent elution in the sealing plate 3, the range of choice of its material is narrowed to aluminum, titanium, niobium, stainless-steel, and the like, whereas when the electrode 5 is set as the negative electrode, many kinds of metals may be employed, such as nickel, copper, brass, zinc, tin, gold, stainless-steel, tungsten, and aluminum.

Meanwhile, in the electric double-layer capacitor 1, the sealing plate 3 does not function as the collector, and hence elution does not occur in the sealing plate 3 even if the electrode 5 is set as the positive electrode, and hence various materials may be employed.

Therefore, in the electric double-layer capacitor 1, the electrode 6 may be set as the positive electrode and the electrode 5 may be set as the negative electrode as in the conventional technology, but further the electrode 6 may be set as the negative electrode and the electrode 5 may be set as the positive electrode.

By the way, the electrolyte differs in range of the potential window, which represents electrochemical stability, depending on the combination of the electrolytic solution and the supporting electrolyte thereof. In order to increase the storage amount, the potentials of the electrodes are changed to reach the upper and lower limits of the range of the potential window to extract energy, and hence the surface area of the positive electrode is demanded to be formed larger than that of the negative electrode. The electrode 5 is formed on the upper surface of the step portion 4, and hence the surface area thereof is formed larger than that of the electrode 6. Thus, this demand is satisfied. This demand is also satisfied even when the polarities of the electrodes are reversed from the case described above.

In the above, an example of the structure of the electric double-layer capacitor 1 is described, but various modifications may be made thereto.

For example, the recessed container 2 is made of a ceramics having alumina as the main component, but may instead be made of a heat resistant material such as a heat resistant resin, a glass, and a glass ceramics.

As the heat resistant resin, a thermoplastic resin is more preferred because heat-welding is possible, and PTFE, PEEK, liquid crystal polymer (LCP), and the like may be employed. The opening portion of the recessed container 2 and the sealing plate 3 may be made of a two-component curable resin, and bonding of the recessed container 2 and the sealing plate 3 may be performed while promoting the chemical reaction by heating.

When the recessed container 2 is made of a glass or a glass ceramics, wiring is performed by performing conductor printing onto the glass or the glass ceramics having a low melting point, and after the lamination is performed, baking is performed at low temperature.

Further, when the recessed container 2 is made of a resin, metallic terminals corresponding to the metallic layers 9 and 11 may be formed by insert molding, or sheet materials made of a resin in which opening portions corresponding to the recessed portion 13 are formed may be laminated together with the metallic terminals, to thereby form the recessed container 2.

In addition, when the recessed container 2 is made of a resin, the sealing plate 3 may be made of a resin. In this manner, it is possible to weld the recessed container 2 and the sealing plate 3 by performing heating while applying pressure, by radiating laser, or by applying ultrasonic waves. In this case, the bonding material 8 is unnecessary.

Note that, in this embodiment, the step portion 4 is formed in the recessed portion 13 so as to define the second bottom surface on which the electrode 5 is to be disposed, but, for example, a protruding portion projecting from the side surface of the recessed portion 13 in a convex shape may be formed, to thereby dispose the electrode 5 on the upper surface of the protruding portion as the second bottom surface.

Further, in this embodiment, the metallic layer 9, the metallic layer 11, the terminal 10, the terminal 12, and the bonding material 8 may be formed of a metal selected from aluminum, stainless-steel, tungsten, nickel, silver, and gold, or a material having a resin containing carbon as the main component. Further, the above-mentioned plurality of metallic materials may be laminated and used at the same time.

According to the embodiment described above, the following effects may be obtained.

(1) An electrode is not required to be bonded onto the sealing plate 3 in advance, and the electrode 5 and the electrode 6 may be disposed in the recessed portion 13 from one direction (from the upper side). Therefore, the assembly work of the electric double-layer capacitor 1 is entirely performed from the upper side with respect to the recessed container 2, which enables easy work and increases productivity. Further, the yield increases. In addition, the electrolyte can be easily injected.

(2) The number of parts to be handled during manufacture is reduced, and hence the manufacturing steps are simplified. Therefore, the productivity increases.

(3) The electrode 5 is not bonded onto the sealing plate 3, and hence the probability of short-circuiting due to elution of a metal is reduced. Further, even if the electrode 5 is set as the positive electrode, the metal forming the sealing plate 3 is not eluted. Therefore, the electrode 5 may be set as the positive electrode and the electrode 6 may be set as the negative electrode, with the result that the surface area of the positive electrode can be formed larger than the surface area of the negative electrode.

(4) The recessed container 2 may be made of a resin, and in this case, by forming the sealing plate 3 of a resin, the recessed container 2 and the sealing plate 3 may be bonded to each other by welding. Accordingly, the bonding material 8 is unnecessary. Further, the choices of the material of the recessed container 2 are widened.

(5) The electrodes 5 and 6 are disposed so as to be opposed to each other. Therefore, a large current is allowed to flow.

FIRST MODIFIED EXAMPLE

Figure 2:
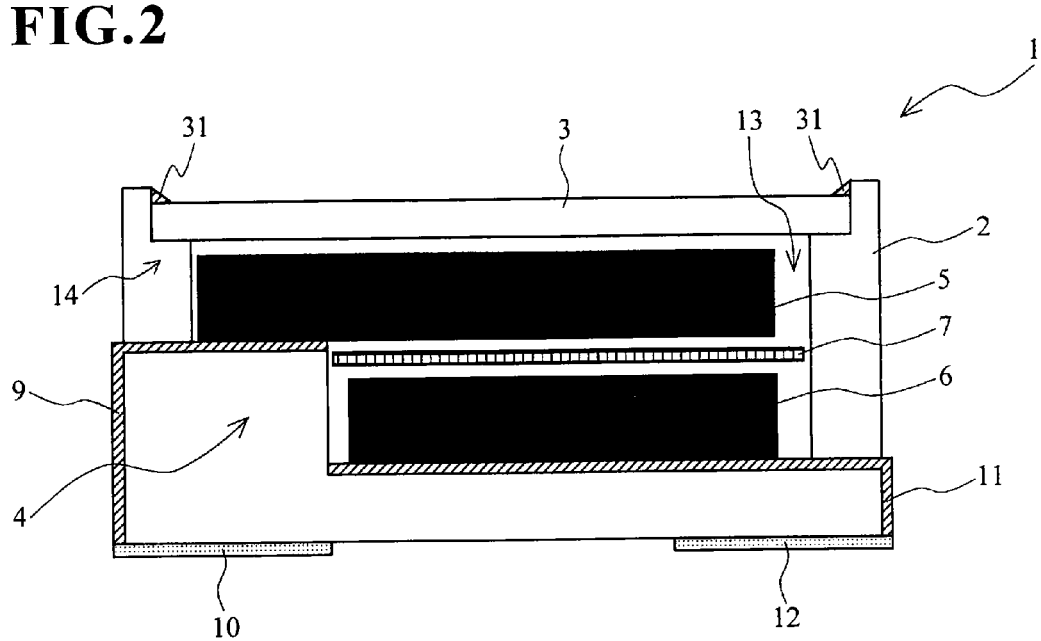
FIG. 2 is a cross-sectional view of an electric double-layer capacitor according to a first modified example of the present invention.

FIG. 2 is a cross-sectional view of an electric double-layer capacitor 1 according to a first modified example of the present invention.

Hereinafter, various modified examples are described, but structures which are the same as those of the electric double-layer capacitor 1 described in the embodiment above are denoted by the same reference symbols.

In the recessed container 2 according to this modified example, a step portion 14 is provided around the entire circumference of the opening portion of the recessed portion 13.

Meanwhile, the outer shape of the sealing plate 3 is formed into the same shape as the opening portion of the recessed portion 13, and the sealing plate 3 is inserted in the opening portion up to the position at which the sealing plate 3 is brought into contact with the step portion 14. The thickness of the sealing plate 3 is set to be smaller than the height of the inner circumference wall of the opening portion reaching the step portion 14, and the inner circumference wall of the opening portion is protruded upwardly beyond the sealing plate 3.

At a corner portion formed between the upper surface of the sealing plate 3 and the protruded portion of the inner circumference wall of the opening portion, a bonding material 31 is formed around the entire circumference thereof, and the sealing plate 3 is bonded to the opening portion by the bonding material 31.

The bonding material 31 is the same member as the bonding material 8. After the sealing plate 3 is fitted into the opening portion of the recessed portion 13, a brazing material or the like is provided to the corner portion and then melted, to thereby form the bonding material 31. Alternatively, the sealing plate 3 and the step portion 14 may be directly welded by heating.

According to this modified example, positioning of the sealing plate 3 with respect to the opening portion becomes easy, and further, the positioning becomes accurate, and hence it is possible to enhance the productivity of the electric double-layer capacitor 1.

SECOND MODIFIED EXAMPLE

Figure 3:
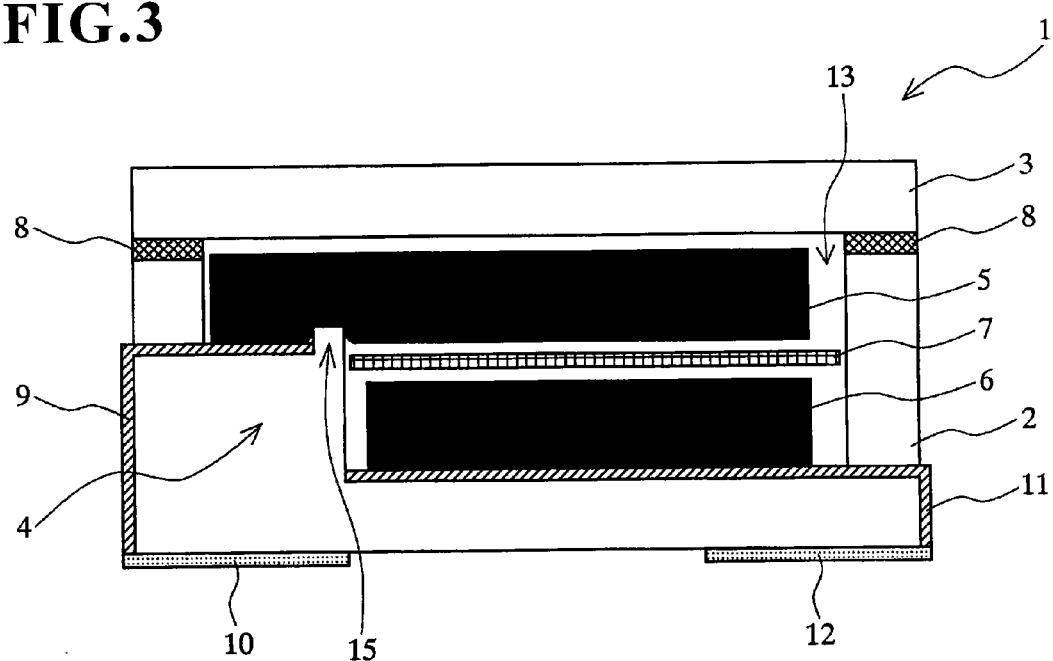
FIG. 3 is a cross-sectional view of an electric double-layer capacitor according to a second modified example of the present invention.

FIG. 3 is a cross-sectional view of an electric double-layer capacitor 1 according to a second modified example of the present invention.

According to this modified example, a protruding portion 15 which protrudes upwardly is formed across the entire end portion of the step portion 4.

The electrode 5 is pushed upwardly by the protruding portion 15 at the end portion of the step portion 4. Further, the metallic layer 9 is not exposed at the end portion of the step portion 4. Therefore, it is possible to effectively prevent the electrode 5 and the electrode 6 from short-circuiting at the end portion of the step portion 4.

THIRD MODIFIED EXAMPLE

Figure 4A:
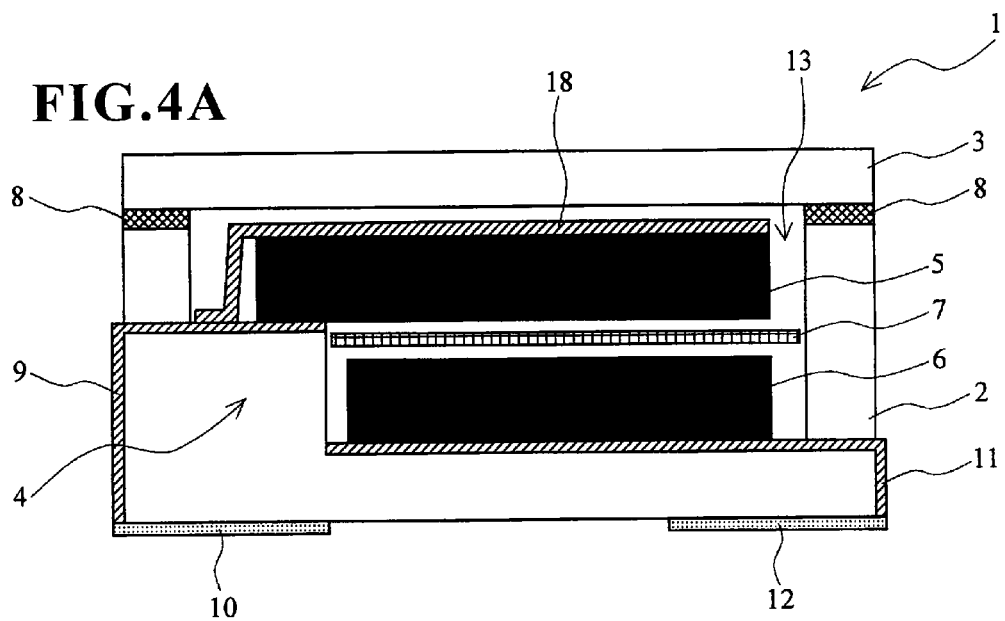
FIGS. 4A to 4C are cross-sectional views of an electric double-layer capacitor according to a third modified example of the present invention.

FIG. 4A is a cross-sectional view of an electric double-layer capacitor 1 according to a third modified example of the present invention.

According to this modified example, a conductor 18 is disposed on the upper surface of the electrode 5. The conductor 18 functions as a collector.

The conductor 18 is made of, for example, an aluminum foil, and is electrically connected to the entire upper surface of the electrode 5, that is, the surface of the electrode 5 on the side opposite to the surface opposed to the electrode 6. The end portion of the conductor 18 on the step portion 4 side is electrically connected to the metallic layer 9.

Here, bonding between the electrode 5 and the conductor 18 is described.

Figure 4B:
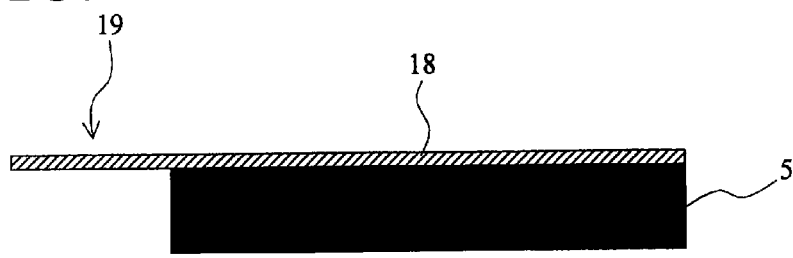

FIG. 4B is a view illustrating a state in which the conductor 18 is bonded onto the electrode 5.

The conductor 18 is bonded onto the upper surface of the electrode 5 while ensuring a bonding region 19 (bonding margin) with the metallic layer 9. The bonding is performed by various methods such as spot resistance welding, spot laser welding, and ultrasonic welding. Further, it is possible to obtain electrical connection by a conductive adhesive.

Figure 4C:
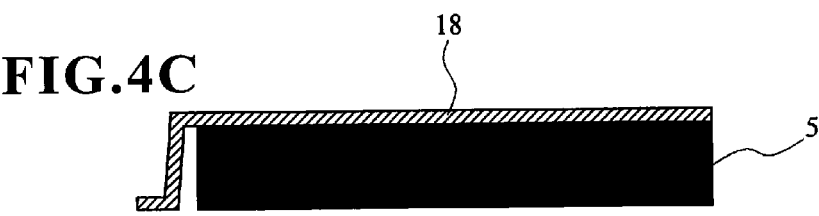

FIG. 4C is a view illustrating a state in which the bonding region 19 is bent. Because the bonding region 19 is bent, a gap is generated between the electrode 5 and the conductor 18.

The bonding region 19 bent as described above is bonded to the metallic layer 9 by various methods such as spot resistance welding, spot laser welding, and ultrasonic welding. Further, it is possible to obtain electrical connection by a conductive adhesive.

According to this modified example, the bonding portion between the metallic layer 9 and the electrode 5 functions as a collector, and also the conductor 18 functions as a collector, and hence it is possible to enhance the performance of the electric double-layer capacitor 1.

FOURTH MODIFIED EXAMPLE

Figure 5:
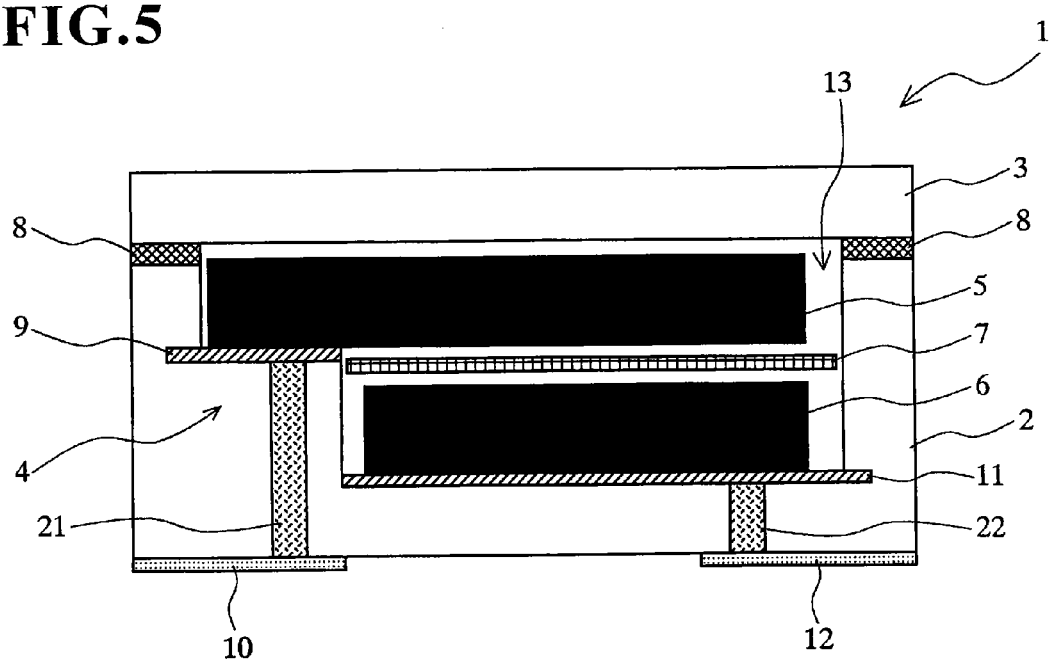
FIG. 5 is a cross-sectional view of an electric double-layer capacitor according to a fourth modified example of the present invention.

FIG. 5 is a cross-sectional view of an electric double-layer capacitor 1 according to a fourth modified example of the present invention.

According to this modified example, through electrodes 21 and 22 (vias) are provided, which pass the recessed container 2 from the bottom surfaces of the recessed portion 13 in a direction of the rear portion of the recessed container 2.

The through electrode 21 has a columnar shape, and an upper end thereof is electrically connected to the metallic layer 9 and a lower end thereof is electrically connected to the terminal 10.

The metallic layer 9 is connected to the terminal 10 via the through electrode 21, and hence the wiring, which passes through the recessed container 2 and extends on the side surface of the recessed container 2 to reach the terminal 10, is unnecessary.

The through electrode 22 is formed similarly to the through electrode 21 in terms of material and shape, and an upper end thereof is electrically connected to the metallic layer 11 and a lower end thereof is electrically connected to the terminal 12.

The metallic layer 11 is connected to the terminal 12 via the through electrode 22, and hence the wiring, which passes through the recessed container 2 and extends on the side surface of the recessed container 2 to reach the terminal 12, is unnecessary.

As described above in the embodiment, the recessed container 2 is formed by laminating the green sheets. In each of the green sheets, holes through which the through electrodes 21 and 22 pass are formed in advance, and by laminating the green sheets, through holes for forming the through electrodes 21 and 22 are formed.

The through electrodes 21 and 22 are formed in the through holes by injecting a conductive paste and then curing the conductive paste, or by inserting column-shaped metals.

Further, when the recessed container 2 is formed by laminating the resin sheets, by forming holes in each of the resin sheets in advance similarly to the green sheets, through holes for the through electrodes 21 and 22 may be formed.

When the recessed container 2 is formed by insert molding, through holes for the through electrodes 21 and 22 may be formed using a metallic mold.

FIGS. 6A to 6D are views illustrating the rear and bottom surfaces of the electric double-layer capacitor 1 according to this modified example.

Figure 6A:
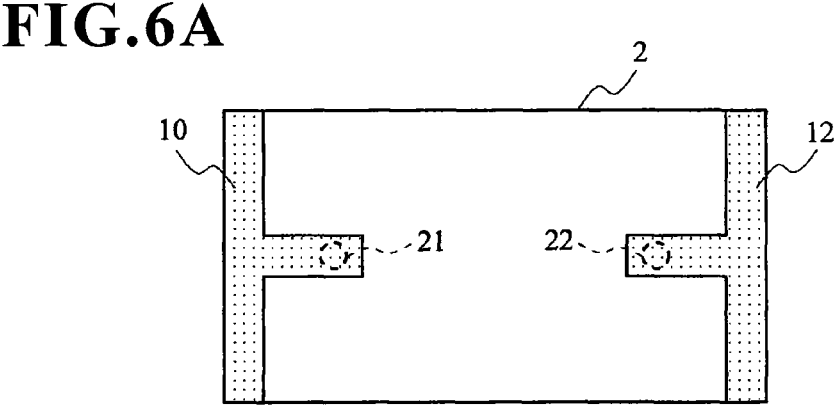
FIGS. 6A to 6D are views of rear and bottom surfaces of the electric double-layer capacitor according to the fourth modified example.

FIG. 6A illustrates an example in which one through electrode 21 and one through electrode 22 are formed.

The through electrode 21 is formed on a central line of the rear surface of the recessed container 2. Further, the terminal 10 has a T shape with a portion formed along a side of the end portion of the recessed container 2 and a portion extending from the center of the above-mentioned portion toward the through electrode 21.

As described above, the terminal 10 is not formed on the entire rear surface of the recessed container 2 from the end portion to the through electrode 21, but is formed to have the T shape, and hence it is possible to cut the amount of the metal for forming the terminal 10. The through electrode 22 is also similarly formed.

Figure 6B:
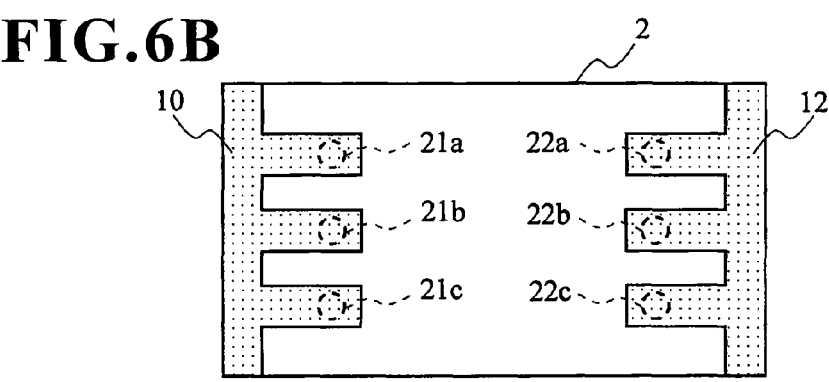

FIG. 6B illustrates an example in which three through electrodes 21a, 21b, and 21c are formed with respect to the metallic layer 9, and three through electrodes 22a, 22b, and 22c are formed with respect to the metallic layer 11.

The through electrodes 21a to 21c are symmetrically formed with respect to the central line of the recessed container 2. Further, the terminal 10 includes a portion formed along the side of the end portion of the recessed container 2 and portions extending from the center of the above-mentioned portion toward the through electrodes 21a to 21c. The through electrodes 22a to 22c are also similarly formed.

By increasing the number of the through electrodes 21 and 22 as described above, it is possible to reduce the resistance when a current is caused to flow through the through electrodes 21 and 22.

In the above, the case where one through electrode 21 and one through electrode 22 are provided and the case where three through electrodes 21 and three through electrodes 22 are provided are described, but those are merely an example, and the number of the through electrodes 21 and 22 may be arbitrarily set.

Figure 6C:
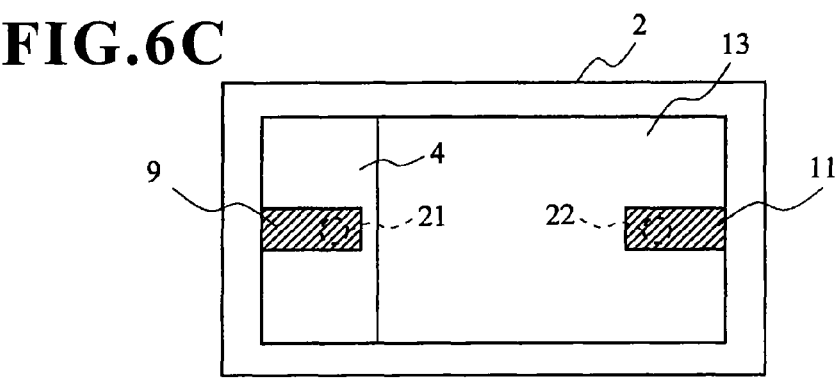

FIG. 6C is a view illustrating a state of the recessed portion 13 when viewed from above in the example of FIG. 6A.

The metallic layer 9 is formed on the upper surface of the step portion 4 at the upper end surface of the through electrode 21 and the periphery thereof, and the metallic layer 11 is formed in the recessed portion 13 at the upper end surface of the through electrode 22 and the periphery thereof.

The metallic layers 9 and 11 may be formed on the entire upper surface of the step portion 4 and the entire bottom surface of the recessed portion 13, respectively, but by respectively forming the metallic layers 9 and 11 in regions at the periphery of the through electrodes 21 and 22 as illustrated in FIG. 6C, it is possible to reduce the manufacturing cost of the metallic layers 9 and 11.

Figure 6D:
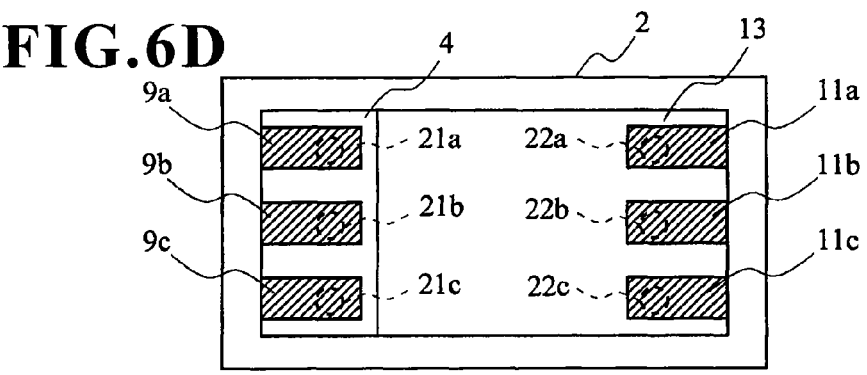

FIG. 6D is a view illustrating a state of the recessed portion 13 when viewed from above in the example of FIG. 6B.

Metallic layers 9a, 9b, and 9c are formed on the upper surface of the step portion 4 at the upper end surfaces of the through electrodes 21a, 21b, and 21c and the periphery thereof, and metallic layers 11a, 11b, and 11c are formed in the recessed portion 13 at the upper end surfaces of the through electrodes 22a, 22b, and 22c and the periphery thereof.

Further, in order to visualize the polarities of the terminals 10 and 12, the shapes of the terminals 10 and 12 may be asymmetry.

Figure 7A:
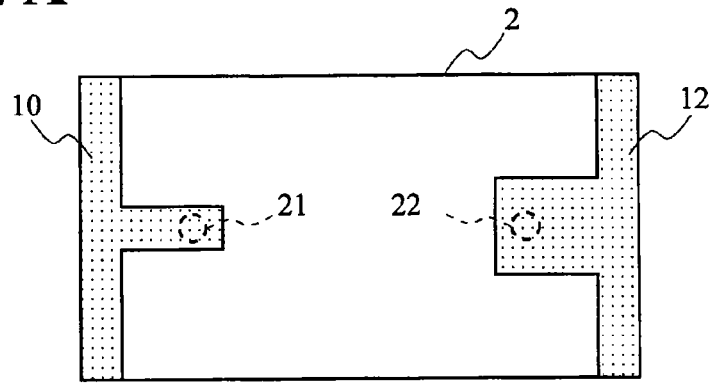
FIGS. 7A to 7D are views illustrating examples of forming terminals in shapes so that polarities are distinguishable.

For example, in an example of FIG. 7A, the width of the terminal 12 at the portion extending toward the through electrode 22 is larger than the width of the terminal 10 at the portion extending toward the through electrode 21. In this manner, the terminals 10 and 12 are distinguishable.

Figure 7B:
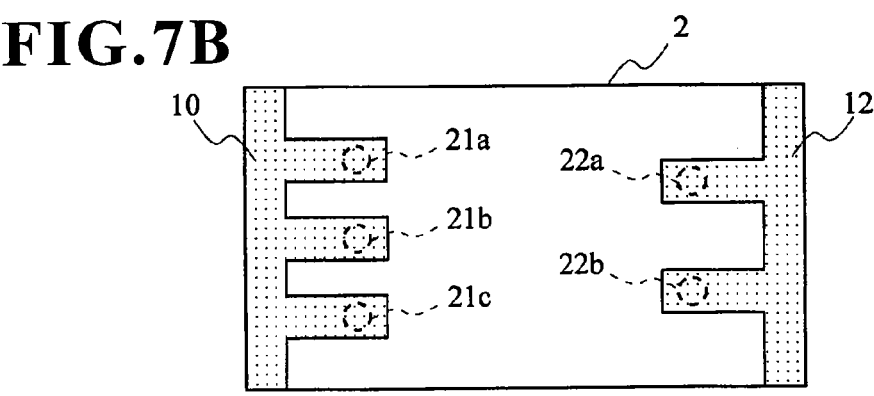

Further, in an example of FIG. 7B, two through electrodes 22a and 22b are formed with respect to three through electrodes 21a, 21b, and 21c, and by the difference of the number of the through electrodes, the terminals 10 and 12 are distinguishable.

Figure 7C:
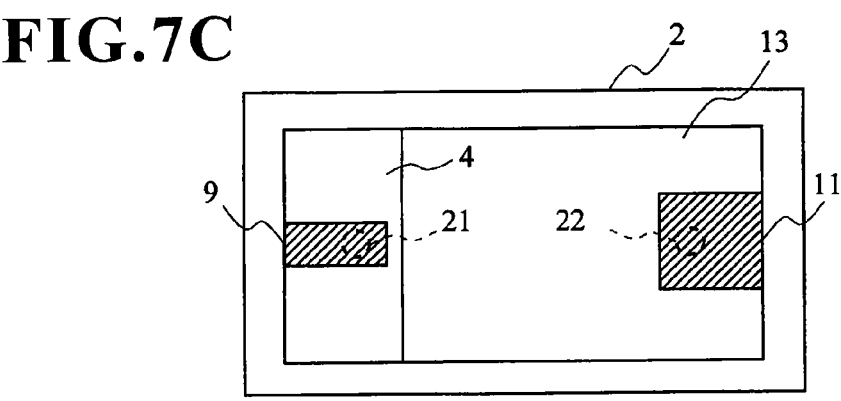

FIG. 7C is a view illustrating a state of the recessed portion 13 when viewed from above in the example of FIG. 7A.

The metallic layer 9 is formed on the upper surface of the step portion 4 at the upper end surface of the through electrode 21 and the periphery thereof, and the metallic layer 11 is formed in the recessed portion 13 at the upper end surface of the through electrode 22 and the periphery thereof.

The metallic layer 11 is formed larger in size than the metallic layer 9, and because the shapes of the metallic layers 9 and 11 are asymmetry, the polarities can be easily visually recognized.

Figure 7D:
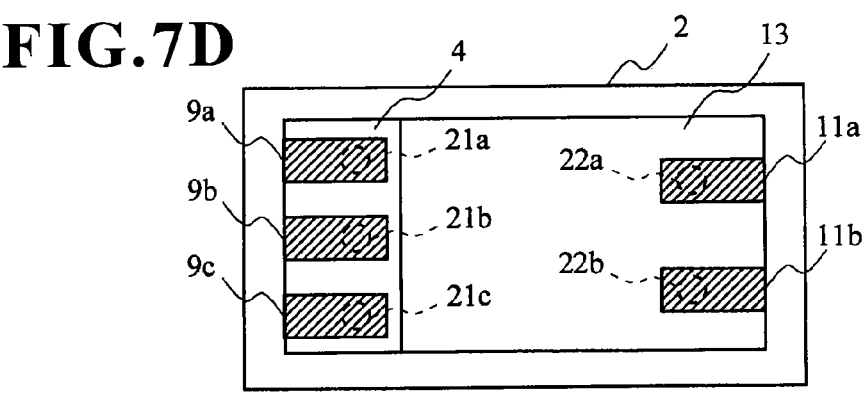

FIG. 7D is a view illustrating a state of the recessed portion 13 when viewed from above in the example of FIG. 7B.

The metallic layers 9a, 9b, and 9c are formed on the upper surface of the step portion 4 at the upper end surfaces of the through electrodes 21a, 21b, and 21c and the periphery thereof, and the metallic layers 11a and 11b are formed in the recessed portion 13 at the upper end surfaces of the through electrodes 22a and 22b and the periphery thereof.

The metallic layers 9a, 9b, and 9c and the metallic layers 11a and 11b are different in number, and hence the polarities can be easily visually recognized.

FIFTH MODIFIED EXAMPLE

Figure 8A:
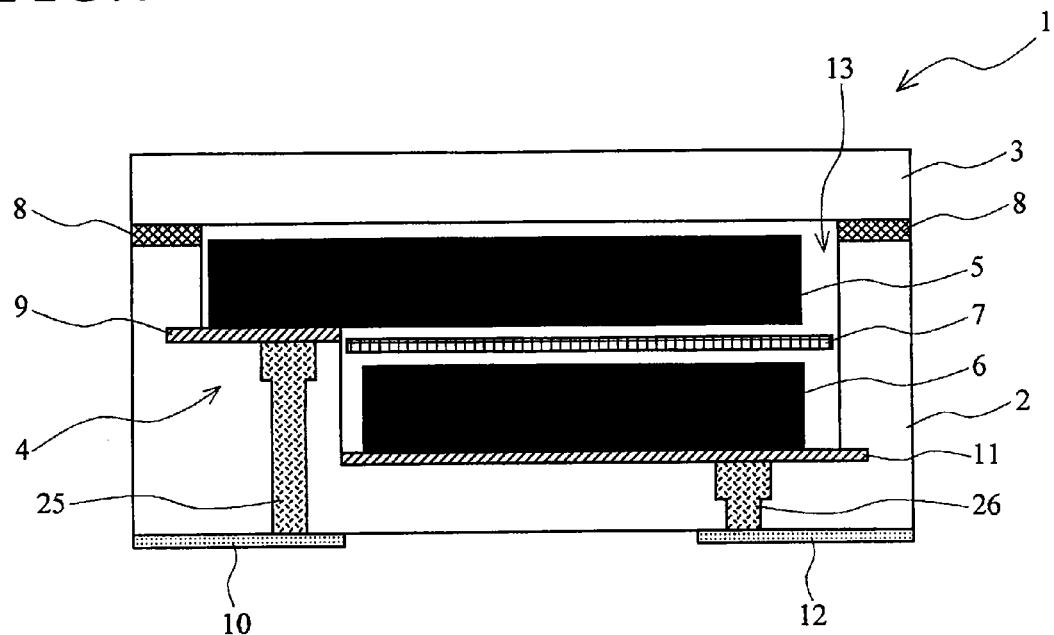
FIGS. 8A and 8B are cross-sectional views of an electric double-layer capacitor according to a fifth modified example of the present invention.

FIG. 8A is a cross-sectional view of an electric double-layer capacitor 1 according to a fifth modified example of the present invention.

The electric double-layer capacitor 1 includes through electrodes 25 and 26, which are similar to the through electrodes 21 and 22 described in the fourth modified example.

In each of the through electrodes 25 and 26, a cross-sectional area on the bottom surface side of the recessed portion 13 (the side connected to the metallic layer 9 or 11) is larger than a cross-sectional area on the rear surface side of the recessed container 2 (the side connected to the terminal 10 or 12).

When the cross-sectional areas of the through electrodes 25 and 26 are set as described above, it is possible to prevent slip-out of the through electrodes 25 and 26.

In the manufacturing steps, when the bonding material 8 is melted to bond the sealing plate 3 and the recessed container 2 to each other, the vapor pressure of the electrolyte increases due to the heating, and an external force acts on the through electrodes 25 and 26 to push out the through electrodes 25 and 26. However, by employing the through electrodes 25 and 26, it is possible to effectively prevent the slip-out.

Figure 8B:
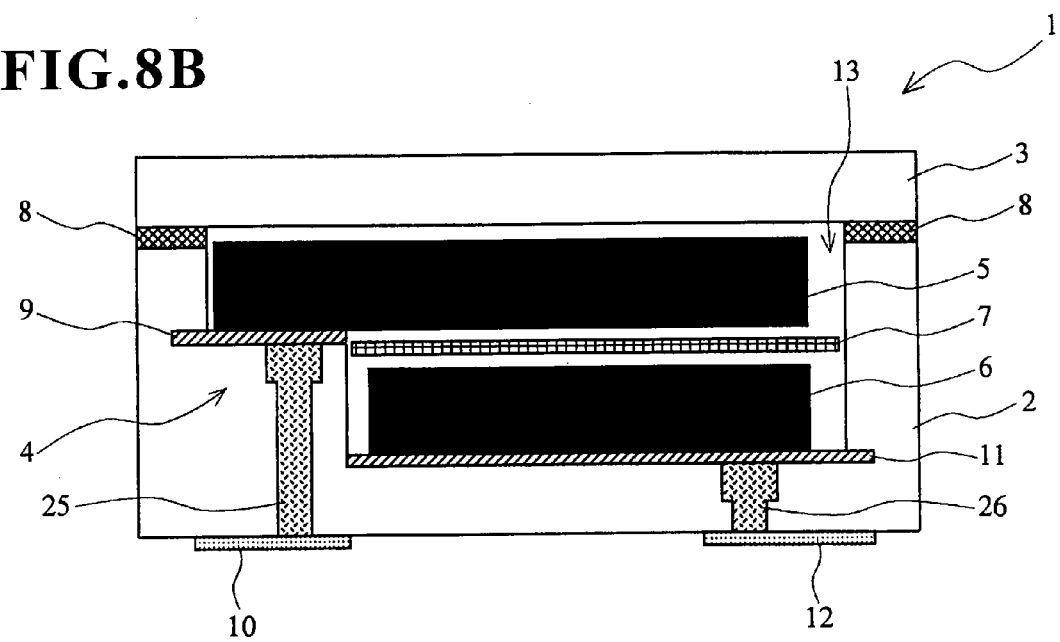

Note that, the through electrodes 21 and 22 are employed to electrically connect the metallic layer 9 and the terminal 10, and the metallic layer 11 and the terminal 12, respectively, and hence as illustrated in FIG. 8B, the terminal 10 and the metallic layer 11 do not need to be formed to reach the end portions of the recessed container 2.

SIXTH MODIFIED EXAMPLE

Figure 9:
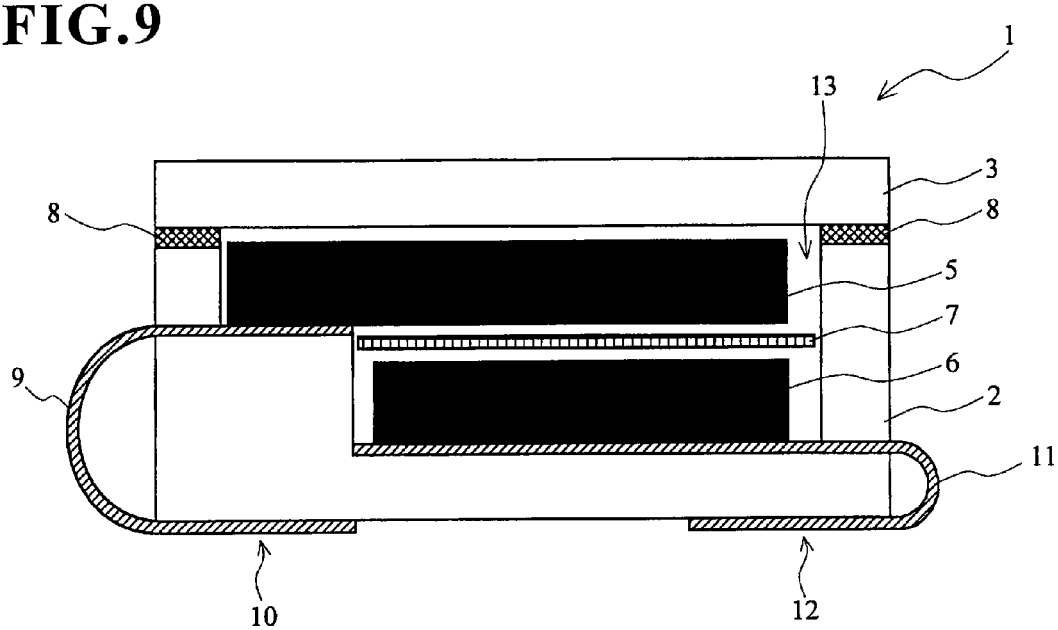
FIG. 9 is a cross-sectional view of an electric double-layer capacitor according to a sixth modified example of the present invention.
Figure 10:
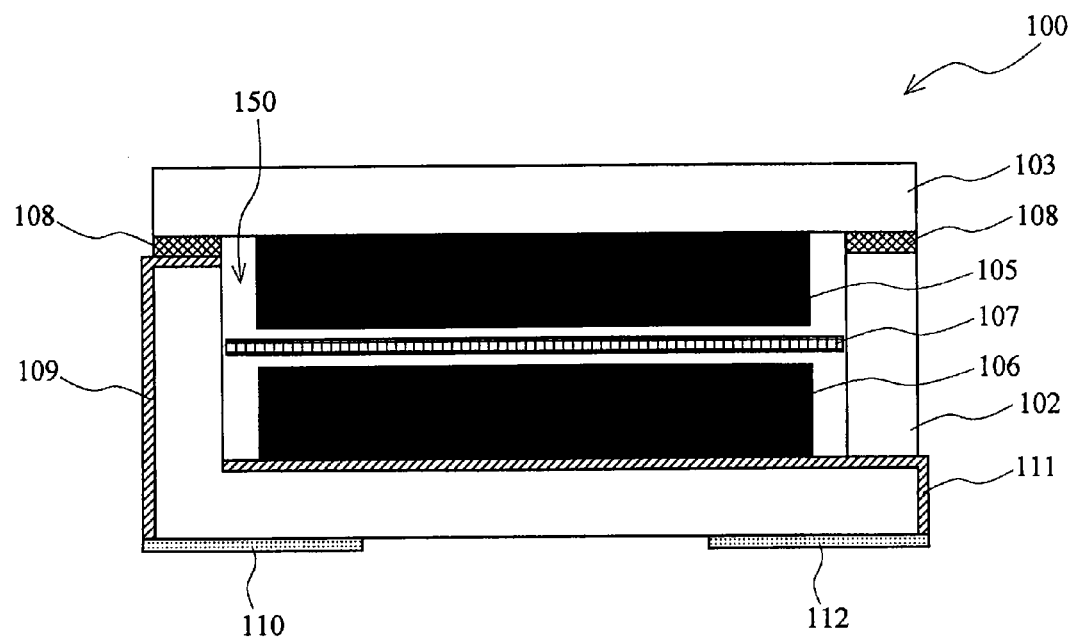
FIG. 10 is a cross-sectional view of a conventional electric double-layer capacitor.

FIG. 9 is a cross-sectional view of an electric double-layer capacitor according to a sixth modified example of the present invention.

When the recessed container 2 is formed by laminating the resin sheet materials, the metallic layers 9 and 11 may be formed by metallic plates.

In this case, the sheet materials, in which opening portions corresponding to the shape of the recessed portion 13 are formed, are laminated, and at this time, the metallic plates constituting the metallic layers 9 and 11 are also laminated.

After those sheet materials and metallic plates are laminated, heating is performed to heat-fuse those members, and thus the recessed container 2 is formed.

Then, the end portions of the metallic layers 9 and 11 are bent and fixed to the rear surface of the recessed container 2. In this manner, the end portions of the metallic layers 9 and 11 may serve as the terminals 10 and 12, respectively.

Further, it is possible to form the recessed container 2 by insert molding, which is performed by fixing the metallic plates to a mold and then injecting a resin into the mold.

According to the embodiment and the modified examples described above, the following structures may be obtained.

In the hollow portion formed by sealing the recessed portion 13 by the sealing plate 3, the bottom portion of the recessed portion 13 serves as the first bottom surface, and the upper surface of the step portion 4 serves as the second bottom surface, which is provided in a plane different from the first bottom surface. Therefore, the container including the recessed container 2 and the sealing plate 3 serves as a container including a hollow portion in which a first bottom surface and a second bottom surface, which is provided in a plane different from the first bottom surface, are formed.

The metallic layer 11 serves as a first conductor, which is formed on the first bottom surface and passes through the container toward an outside. The metallic layer 9 serves as a second conductor, which is formed on the second bottom surface and passes through the container toward the outside.

The electrode 6 serves as a first electrode disposed on the first conductor in the hollow portion, and the electrode 5 serves as a second electrode, which is disposed on the second conductor in the hollow portion and is opposed to the first electrode at a predetermined interval.

The electrolyte sealingly filled in the recessed portion 13 serves as an electrolyte, which is provided in contact with the first electrode and the second electrode.

The recessed portion 13 includes the step portion 4, and the upper surface of the step portion 4 serves as the second bottom surface. Therefore, the hollow portion includes a step portion including a step, which is formed at a bottom surface of the hollow portion, and the second bottom surface includes an upper surface of the step portion.

The metallic layer 9 is electrically connected to the terminal 10, and the metallic layer 11 is electrically connected to the terminal 12. Therefore, the first conductor and the second conductor are connected to a first connection terminal and a second connection terminal, respectively, which are formed on a rear surface of the container.

In the third modified example, the conductor 18 is disposed on the entire upper surface of the electrode 5 as a collector, and the upper surface of the electrode 5 corresponds to a surface on an opposite side of a surface (lower surface) opposed to the electrode 6. Therefore, the conductor 18 serves as a third conductor, which is disposed on a surface of the second electrode on a rear side of a surface opposed to the first electrode, and is connected to the second conductor.

Further, the electrode 5 is not bonded onto the sealing plate 3, and hence the electrode 5 may be set as the positive electrode, and the electrode 6 may be set as the negative electrode. Further, the surface area of the electrode 5 may be set larger than that of the electrode 6. Therefore, the first electrode and the second electrode may be a negative electrode and a positive electrode, respectively, and the second electrode may have a surface area larger than a surface area of the first electrode.

The protruding portion 15 formed at the edge of the step portion 4 in the second modified example serves as a protruding portion, which is formed at a side of an end portion of the step portion and protrudes in an upper direction of the container.

In the embodiment and the like, each of the metallic layer 9 and the metallic layer 11 passes through the side surface of the recessed portion 13, which is sealed by the sealing plate 3, toward the outside. Therefore, each of the first conductor and the second conductor passes through a side surface of the hollow portion.

In the fourth modified example and the like, the through electrode 21 passes through the recessed container 2 from the upper surface (second bottom surface) of the step portion 4 to the rear surface of the recessed container 2, and the through electrode 22 passes through the recessed container 2 from the bottom (first bottom surface) of the recessed portion 13 to the rear surface of the recessed container 2. Therefore, the first conductor passes through the first bottom surface, and the second conductor passes through the second bottom surface.

Further, the electric double-layer capacitor 1 can be used, for example, in backup power sources for a memory and a clock for mobile phones.

In this case, in the mobile phone, the electric double-layer capacitor 1 is charged simultaneously with attachment of a battery as a main power source, and at the time of battery replacement or a decrease in a voltage of the main power source, releases electric charge that has been stored in the electric double-layer capacitor 1 so as to supply power to the memory and maintain a clock function and the like.

Thus, the mobile phone serves as an electronic device including the electronic component constituted by the electric double-layer capacitor 1, charging means for charging the electronic component simultaneously with the attachment of the battery as a main power source, other electronic components exerting predetermined functions such as those of a memory and a clock, and power supply means for supplying power to the other electronic components with use of electric charge that is stored in the electric double-layer capacitor 1, for example, in such a manner that electric charge that has been stored in the electric double-layer capacitor 1 is released so that power is supplied to the memory and the clock.

Further, in a manufacturing method for the electric double-layer capacitor 1, first, the recessed container 2 including the recessed portion 13 is formed. Therefore, the manufacturing method includes forming a container including a recessed portion in which a first bottom surface and a second bottom surface, which is provided in a plane different from the first bottom surface, are formed.

Next, the metallic layers 9 and 11 and the through electrodes 21 and 22 can be formed together with the recessed container 2, or, after the recessed container 2 is formed, the through electrodes 21 and 22 can be formed in the through holes. Therefore, the manufacturing method includes forming a first conductor, which passes through the container from the first bottom surface toward an outside, and forming a second conductor, which passes through the container from the second bottom surface toward the outside, the forming of the first conductor and the forming of the second conductor being carried out one of together with and after the forming of the container.

Next, the electrode 6 is disposed on the metallic layer 11 from the opening portion of the recessed container 2. Therefore, the manufacturing method includes disposing a first electrode on the first conductor from an opening portion of the recessed portion.

Next, the electrode 5 is disposed on the metallic layer 9 from the opening portion of the recessed container 2, so as to be opposed to the electrode 6 at a predetermined interval. Therefore, the manufacturing method includes disposing a second electrode on the second conductor from the opening portion of the recessed portion, so as to be opposed to the first electrode at a predetermined interval.

Note that, in a case where the separator 7 is disposed between the electrode 6 and the electrode 5, after the separator 7 is disposed on the upper surface of the electrode 6, the electrode 5 is mounted.

Next, the electrolyte is supplied into the recessed portion 13. Therefore, the manufacturing method includes supplying an electrolyte to be provided in contact with the first electrode and the second electrode.

Next, the opening portion of the recessed container 2 is sealed by the sealing plate 3. Therefore, the manufacturing method includes sealing the opening portion by a sealing member.

In the embodiment and the modified examples thereof, the electric double-layer capacitor is described as an example of the electrochemical cell constituting an electronic component. However, as described above, the electronic component may include electrochemical cells of other types, such as a non-aqueous electrolytic cell.

For example, the electronic component may be a battery including: as a negative electrode (electrode 5), an electrode sheet containing silicon oxide (50 wt %) activated by metallic lithium, a conduction aid (40 wt %), and a polyacrylic binding agent (20 wt %); as a positive electrode (electrode 6), an electrode sheet containing an active material (85 wt %) in which elements of lithium-manganese-oxygen have a spinel type crystal structure, a conduction aid (10 wt %), and a PTFE-based binding agent (5 wt %); a separator made of a glass fiber; and an electrolytic solution of 1 M $LiN(SO_2CF_3)_2$ in PC. Here, each size of the positive electrode and the negative electrode may be set to 1 mm (length)×1.5 mm (width)× 0.2 mm (thickness).

Further, in addition to the above-mentioned active material of the positive electrode, $Li_4Ti_5O_{12}$, $Li_4Mn_5O_{12}$, $LiCoO_2$, and the like may be used. Further, as the active material of the negative electrode, Li—Si—O, Li-AL, and the like may be used. In addition, by using an electrolytic solution of 1 M $LiBF_4$ in PC, a lithium-ion battery may be formed. In this case, a conduction aid or a binding agent may be used in combination with each active material.

In this case, in the mobile phone, the electric double-layer capacitor 1 is charged simultaneously with attachment of a battery as a main power source, and at the time of battery replacement or a decrease in a voltage of the main power source, releases electric charge that has been stored in the electric double-layer capacitor 1 so as to supply power to the memory and maintain a clock function and the like.

Further, as structures of an electronic component and an electronic device, the following structures a to I may be employed.

(1) Structure a: "An electronic component, comprising:
a container including a hollow portion in which a first bottom surface and a second bottom surface, which is provided in a plane different from the first bottom surface, are formed;
a first conductor, which is formed on the first bottom surface and passes through the container toward an outside;
a second conductor, which is formed on the second bottom surface and passes through the container toward the outside;
a first electrode disposed on the first conductor in the hollow portion;
a second electrode, which is disposed on the second conductor in the hollow portion and is opposed to the first electrode at a predetermined interval; and
an electrolyte, which is provided in contact with the first electrode and the second electrode."

(2) Structure b: "An electronic component according to structure a, wherein:
the hollow portion includes a step portion including a step, which is formed at a bottom surface of the hollow portion; and
the second bottom surface includes an upper surface of the step portion."

(3) Structure c: "An electronic component according to structure a or b, wherein the first conductor and the second conductor are connected to a first connection terminal and a second connection terminal, respectively, which are formed on a rear surface of the container."

(4) Structure d: "An electronic component according to structure a, b, or c, further comprising a third conductor, which is disposed on a surface of the second electrode on a rear side of a surface opposed to the first electrode, and is connected to the second conductor."

(5) Structure e: "An electronic component according to any one of structures a to d, wherein:
the first electrode and the second electrode are a negative electrode and a positive electrode, respectively; and
the second electrode has a surface area larger than a surface area of the first electrode."

(6) Structure f: "An electronic component according to any one of structures a to e, further comprising a protruding portion, which is formed at a side of an end portion of the step portion and protrudes in an upper direction of the container."

(7) Structure g: "An electronic component according to any one of structures a to f, wherein each of the first conductor and the second conductor passes through a side surface of the hollow portion."

(8) Structure h: "An electronic component according to any one of structures a to f, wherein the first conductor passes through the first bottom surface, and the second conductor passes through the second bottom surface."

(9) Structure i: "An electronic device, comprising:
the electronic component according to any one of structures a to h;
charging means for charging the electronic component;
another electronic component exerting a predetermined function; and
power supply means for supplying power to the another electronic component with use of electric charge that is stored by the charging means."

What is claimed is:

1. An electronic component, comprising:
a container including a hollow portion in which a first bottom surface and a second bottom surface, which is provided in a plane different from the first bottom surface, are formed;
a first conductor, which is formed on the first bottom surface and passes through the container toward an outside;
a second conductor, which is formed on the second bottom surface and passes through the container toward the outside;
a first electrode disposed on the first conductor in the hollow portion; a second electrode, which is disposed on the second conductor in the hollow portion and is opposed to the first electrode at a predetermined interval; and
an electrolyte, which is provided in contact with the first electrode and the second electrode.

2. An electronic component according to claim 1, wherein:
the hollow portion comprises a step portion including a step, which is formed at a bottom surface of the hollow portion; and
the second bottom surface comprises an upper surface of the step portion.

3. An electronic component according to claim 1, wherein the first conductor and the second conductor are connected to a first connection terminal and a second connection terminal, respectively, which are formed on a rear surface of the container.

4. An electronic component according to claim 1, further comprising a third conductor, which is disposed on a surface of the second electrode on a rear side of a surface opposed to the first electrode, and is connected to the second conductor.

5. An electronic component according to claim 1, wherein: the first electrode and the second electrode are a negative electrode and a positive electrode, respectively; and the second electrode has a surface area larger than a surface area of the first electrode.

6. An electronic component according to claim 1, further comprising a protruding portion, which is formed at a side of an end portion of a step portion and protrudes in an upper direction of the container.

7. An electronic component according to claim 1, wherein each of the first conductor and the second conductor passes through a side surface of the hollow portion.

8. An electronic component according to claim 1, wherein the first conductor passes through the first bottom surface, and the second conductor passes through the second bottom surface.

9. An electronic device, comprising: the electronic component according to claim 1; charging means for charging the electronic component; another electronic component exerting a predetermined function; and power supply means for supplying power to the another electronic component with use of electric charge that is stored by the charging means.

* * * * *